United States Patent
Hudspeth et al.

[15] 3,666,038
[45] May 30, 1972

[54] AIR PULSING SYSTEM

[72] Inventors: Steve A. Hudspeth; John B. Lunsford, both of Springfield, Oreg.

[73] Assignee: FMA, Inc., Eugene, Oreg.

[22] Filed: Oct. 8, 1970

[21] Appl. No.: 79,124

[52] U.S. Cl..............................180/66 B, 60/57 R, 60/62, 417/231
[51] Int. Cl. ..................................B60k 3/00, B60k 27/00
[58] Field of Search.................180/66 B, 66 R; 60/62, 57 R, 60/57 T, 6; 417/231, 233

[56] References Cited

UNITED STATES PATENTS

| | | | |
|---|---|---|---|
| 1,017,835 | 2/1912 | Wilkinson | 60/62 X |
| 1,264,094 | 4/1918 | Laisne | 180/66 B UX |
| 1,332,428 | 3/1920 | Cooper | 60/57 R UX |
| 1,337,501 | 4/1920 | Arluskes | 60/62 X |
| 1,469,140 | 9/1923 | Baisden | 417/231 |
| 1,503,922 | 8/1924 | Slater | 60/62 |
| 1,862,195 | 6/1932 | Newton | 417/233 |
| 2,941,608 | 6/1960 | Parrish | 180/66 R X |

Primary Examiner—Benjamin Hersh
Assistant Examiner—Milton L. Smith
Attorney—James D. Givnan, Jr.

[57] ABSTRACT

A system utilizing a pressure storage vessel for initially charging a first air cylinder of a series of air cylinders. Valve means admits a flow of pressurized air, in a sequential manner, into the cylinders for piston movement downwardly to compress spring members to a loaded condition. Additional valve means, closed during downward piston movement, are subsequently actuated to permit discharge of an air impulse, by the action of said spring combined with a second source of air pressure acting on the underside of the piston. The last cylinder of the series is operable to impart a force to a media for the operation of a motor for powering a vehicle.

7 Claims, 3 Drawing Figures

STEVE A. HUDSPETH
JOHN B. LUNSFORD
INVENTOR.

BY
AGENT

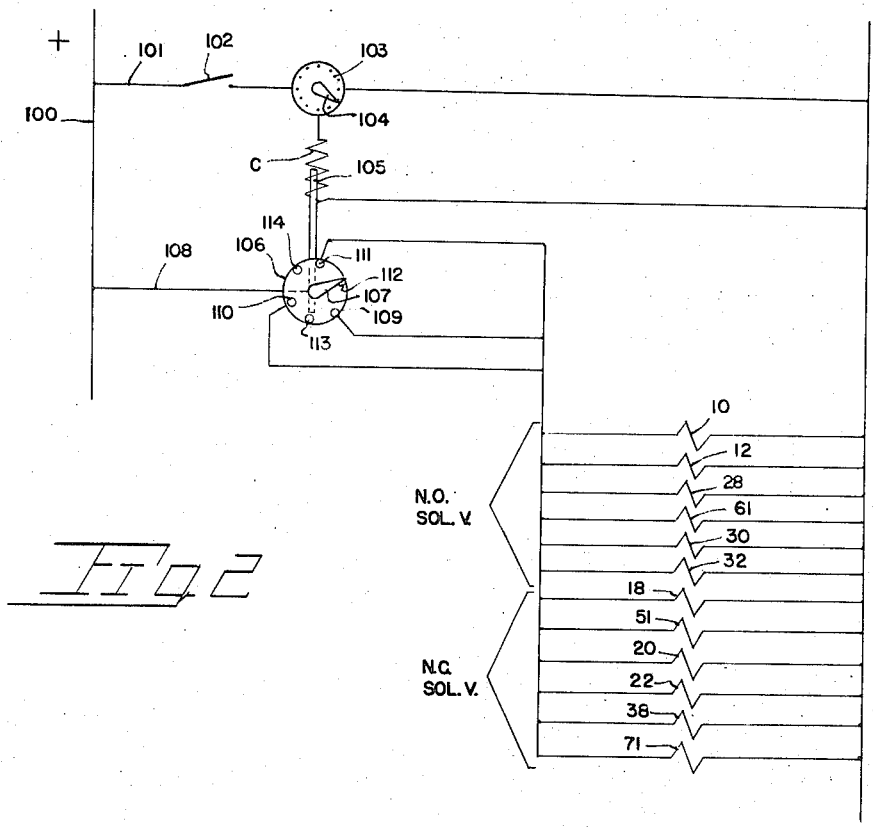
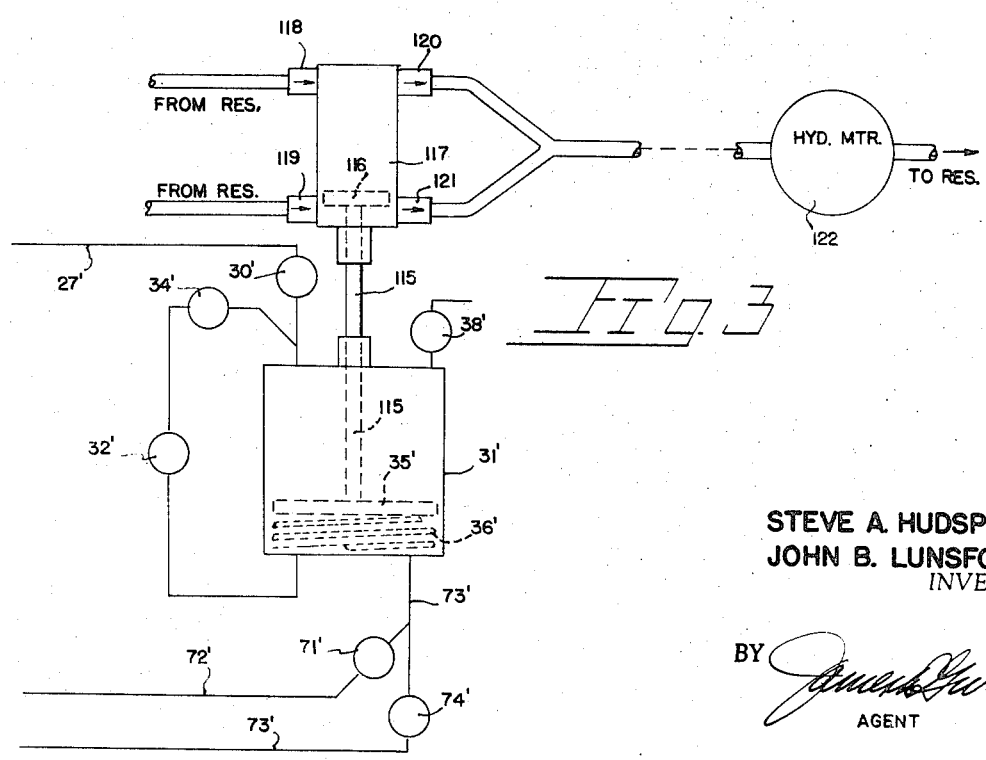
STEVE A. HUDSPETH
JOHN B. LUNSFORD
INVENTOR.

3,666,038

AIR PULSING SYSTEM

BACKGROUND OF THE INVENTION

The present invention relates generally to a system for converting a pressurized air flow into a pulsating air flow wherein the air impulses are utilized to impart movement to a motor for powering of a vehicle.

The use of air as a media for imparting a driving force to the power train of a vehicle has, to a large extent, not proved practical. Further, the use of fluid powered motors associated in direct drive with a vehicles wheels also has apparently not proved practical for one reason or another. In such embodiments, fluid as a media for transmitting power is pressurized to provide a constant pressure flow through fluid motors associated with the vehicle wheels. The pumps in such arrangements are powered by the vehicles internal combustion engines.

SUMMARY OF THE INVENTION

The present invention is embodied in a series of cylinders with each cylinder having both a piston reciprocal therein responsive to differential pressures and resilient means acting on its piston. Air flows sequentially through the cylinders and ultimately past an air motor for conversion of the air flow to mechanical power. Air conduits in communication with each cylinder direct an air flow alternately to opposite sides of the piston therein with the air being forcefully discharged from each cylinder by the combined action of air pressure and the resilient member associated with the cylinder. Downstream of the motor is a low pressure tank constituting a source of low pressure air. Low pressure air is utilized to assist the resilient member of each cylinder to forcefully exhaust the air from the cylinder.

A high pressure tank provides an initial flow of high pressure air to the first cylinder of the series of cylinders. The tank may be of the type intermittently charged by compressor means or a storage tank capable of receiving periodic charges of air or a combination thereof.

BRIEF DESCRIPTION OF THE DRAWING

In the accompanying drawing:
FIG. 2 is a wiring schematic,
and
FIG. 3 is a schematic of a portion of the pulsing system showing a modification thereof.

DESCRIPTION OF THE PREFERRED EMBODIMENTS

Figure 1:
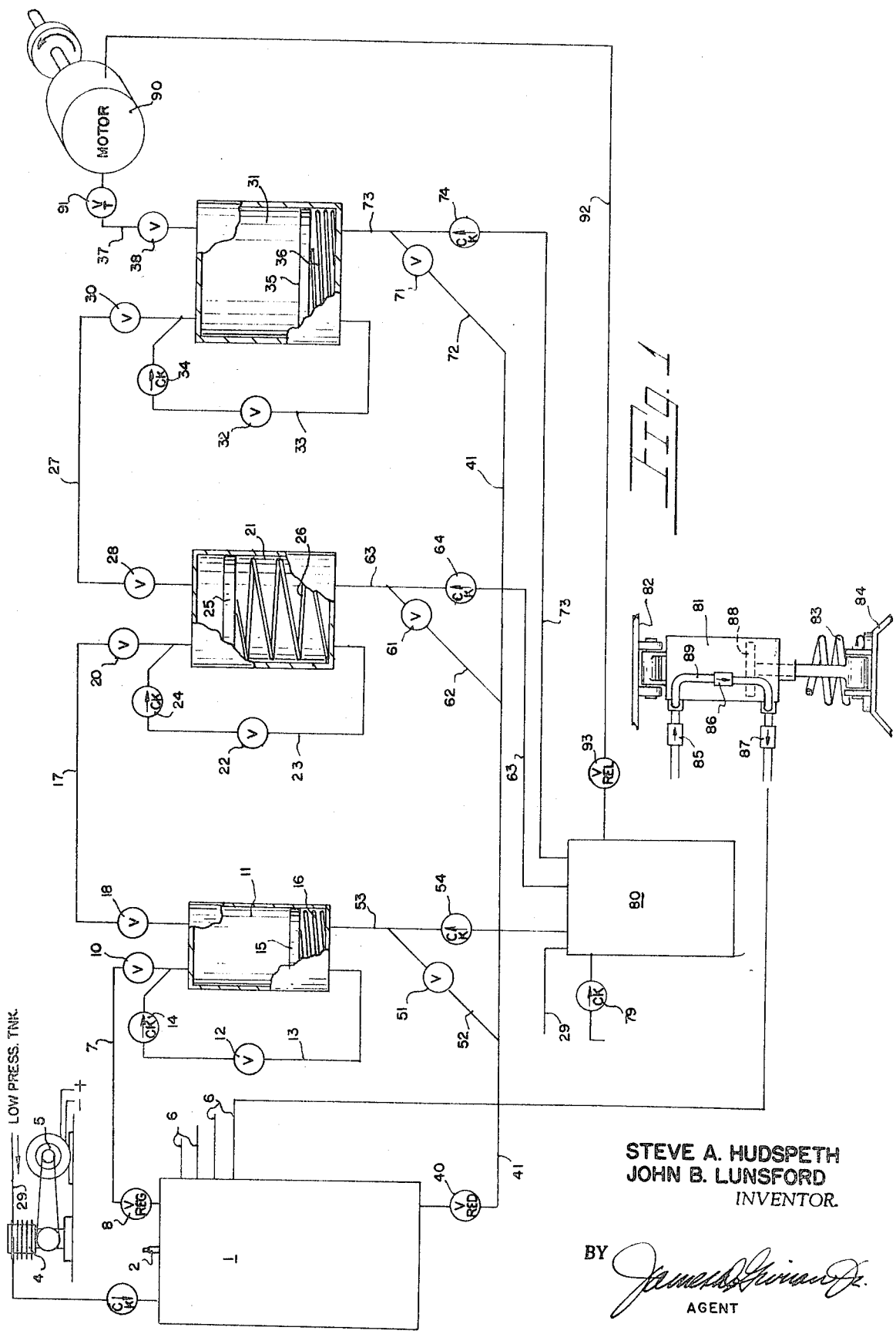
FIG. 1 is a schematic of the air pulsing system.

With continuing reference to the drawings in which applied reference numerals indicate parts similarly identified in the following specification, the reference numeral 1 indicates a pressure storage vessel, charged with air in the present embodiment and for present purposes is termed a high pressure tank and may include conventional accumulator means.

For charging of the tank from an external air source, the tank is fitted with a valve at 2. While the term air is used it will be understood that other medias such as hydraulic fluid may be used within the scope of the invention. An additional source of pressurized air for tank 1 is in the form of a compressor at 4 powered by an electric motor 5. Constituting another or alternative source of air under pressure are tank supply lines at 6 each in communication at their unseen ends with air cylinders. The air cylinders are disposed adjacent each wheel of the vehicle for powering by travel of the wheel suspension member in relation to the vehicle frame and are, in combination with additional elements, the subject of a co-pending patent application, serial No. 97,125 filed Oct. 8, 1970, and entitled Vehicular Air Compression System. The tank 1 of the present system may be pressurized by one or more of the means above described. Details of the air cylinder are later described.

Exiting from tank 1 is a high pressure conduit 7 with a pressure regulator 8 therein. In one embodiment of the invention a line pressure of 80 PSI is provided to a first solenoid operated inlet valve 10 controlling the entry of air into a first air cylinder 11 of a series of air cylinders including cylinders at 21 and 31 each of increasing volume. Corresponding to valve 10 for controlling air to those other air cylinders are solenoid operated inlet valves 20 and 30 while similar valves at 12, 22 and 32 hereinafter referred to as transfer valves control the air flow intermediate the ends of each cylinder. These latter valves are located in transfer lines 13, 23, 33 communicating the opposite ends of each cylinder with check valves at 14, 24 and 34 for unidirectional air flow as indicated. Valves 10, 12 and 30, 32 are normally (deenergized) open in the present embodiment while valves 20, 22 are normally closed.

Each cylinder includes a piston 15, 25 and 35 biased by an internal compression loaded helical spring at 16, 26 and 36 toward the high pressure inlet side of the cylinders. The springs 16, 26 and 36 each have progressively greater spring rates for exerting a greater force on their respective pistons.

Exhaust conduits at 17, 27 and 37 for the series of cylinders directs air past exhaust control valves respectively at 18, 28 and 38 with exhaust conduits 17 and 27 being in communication with the solenoid operated inlet valves 20 and 30 serving the second and third air cylinders. Valves 18 and 38 are normally closed with valve 28 being of the normally open type.

What may be termed a low pressure air system provides that area below each of the pistons of each cylinder with a source of air under 10 PSI (above atmospheric) for actuation of their piston in the direction of spring biased movement. A low pressure regulator 40, in a conduit 41, reduces downstream pressure in conduit 41 to approximately the 10 PSI. Indicated at 51, 61 and 71 are solenoid operated valves in lines 52, 62 and 72 all branching off from conduit 41. Valves 51 and 71 are of the normally closed type while valve 61 is normally open.

Additionally included in the low pressure system is a low pressure storage tank 80 constituting a second source of low pressure air for the cylinders 11, 21 and 31. A check valve at 79 admits air to tank 80 when less than atmospheric pressure is in the tank. Air exits tank 80 via lines 53, 63 and 73 past check valves 54, 64 and 74 with said lines incorporating Y connections to receive lines 52, 62 and 72. The check valves 54, 64 and 74 are of the conventional spring biased type with the closing action of their springs offset in a combined manner by the negative upstream pressure during a merging air flow from line 52 into line 53. An air line 29 is advantageously used to provide a source of low pressure air from tank 80 to compressor 4.

Served by exhaust conduit 37 is an air motor 90 to which a pulsating flow of air is provided past a regulating valve 91. The motor 90 may be of a conventional type such as a sliding vane type. A flywheel at 92 may be utilized to modify the effect of the irregular air impulses on the rotational speed of the motor shaft.

It will be apparent that the motor 90 may be fed by a second series of like cylinders, if desired, to provide air impulses at a greater frequency to said motor.

With reference to the wiring schematic of FIG. 2 one side of an electrical source is indicated at 100, a first circuit includes lead 101 with an off-on master control switch 102 therein closeable to energize a timer 103 with a rotor arm 104 for closing a second circuit at desired intervals to a coil C actuating the armature 105 of a stepping switch 106. Stepping switch 106 and its switch arm at 107 are operated by armature 105 to close circuits in alternate positions for operation of the solenoid operated valves. Moveable switch arm 107 of the stepping switch, in circuit via a conductor 108 with the electrical source, moves into timed contact with the contacts at 109, 110 and 111 to actuate said valves with alternate arm positions at 112, 113, and 114 opening the valve operating circuits to permit said valves to return to their normal position.

With a pulsing cycle starting with the valves in their normal (deenergized) positions air flows past valve 10 into the top end of cylinder 11 with air below the piston being ported past open valve 12 and check 14 for convergence with the incoming air.

Simultaneously for the second cylinder 21, normally closed valve 20 is closed as is valve 22 while normally open valves 28 permits a pulse of air to be exhausted from cylinder 21 by action of the spring biased piston 25 supplemented by spring 26 and an incoming air flow entering past open valve 61 and check 64.

Simultaneously for the third cylinder 31, normally open valve 30 admits the air impulse into the cylinders top end while air below the descending piston is transferred past normally open valve 32 and check 34 for mergence with the incoming flow of air. Normally closed valves 38 and 71 are closed at this time preparatory to the stepping switch energizing the solenoid valves at which time the condition of the valves is reversed to permit spring 36, assisted by an incoming air flow, to forcefully travel to the upper end of cylinder 31 discharging an impulse of air to motor 90.

For purposes of completeness of the present disclosure the wheel air cylinder is indicated at 81 and, as aforesaid, is included in the subject matter of a second U.S. patent application filed by the present inventors. The cylinder 81 is attached at its upper end to a vehicle frame member 82 and oppositely the cylinders piston rod end 83 is connected to a wheel suspension member 84 of a vehicle. Check valves at 85, 86 and 87 permit a flow of air as indicated into the upper end of cylinder 81 from whence it is expelled by the upward stroke of piston 88. A transfer conduit at 89 directs said flow to the rod side of the rising piston 88 during raising movement of the suspension member 84. Subsequent opposite movement of the suspension member 84 as urged by the vehicle suspension spring 92 causes piston 88 to exhaust air therebelow past check 87 to tank 1.

A modified form of the invention is disclosed in FIG. 3 wherein the third cylinder of the above described form of the invention is replaced by a cylinder 31'. Valves at 30', 32', 38', 71', and 74' in air lines 27', 72' and 73' all function in accordance with the first described form of the invention. A departure exists in that the piston 35' urged by spring 36' is provided with a piston rod 115. The rod 115 terminates upwardly in a second piston 116, the latter being the piston of a double acting hydraulic pump at 117. An incoming flow enters alternately through check valves 118-119 while fluid is alternately exhausted, under pressure, past check valves 120-121 to a hydraulic motor 122. It is to be understood that the hydraulic circuit would include the normal components of any hydraulic circuit, e.g., pressure relief and flow control valves, etc.,.

Motors 90, and 122 of the modified form, may drive through suitable transmission and drive train components well known to those skilled in the present art.

While we have shown but two embodiments of the invention it will be apparent to those skilled in the art that the invention may be embodied still otherwise without departing from the spirit and scope of the invention.

Having thus described the invention what we desire to secure under a Letters Patent is:

1. A system for converting air under constant pressure to a pulsating air flow wherein the air impulses at peak pressure are of a substantially greater pressure value than said constant pressure for driving of a motor, said system comprising,
   a pressure storage vessel,
   a series of air cylinders each of progressively greater volume adapted to receive an air charge in an alternating manner, piston means within each of said cylinders, compressible means associated with each of said pistons and actuated upon the downward stroke of its piston for the conservation of energy expended by the piston, an air transfer line extending intermediate the ends of each cylinder and a transfer valve in each of said lines,
   a fluid operated motor driven by the last cylinder of the series,
   high pressure conduits intercommunicating the upper ends of said cylinders to provide same with a source of pressurized air, the first cylinder of the series receiving air via a high pressure conduit from said storage vessel with the remaining cylinders of the series receiving air moving sequentially through said cylinders,
   inlet valves in said conduits admitting air under pressure to the upper ends of the cylinders for downward displacement of their pistons,
   exhaust valves also in said conduits permitting an exhaust of air from the upper ends of the cylinders during upward piston movement,
   low pressure conduits in communication with the lower ends of said cylinders and in communication with a source of low pressure air,
   valves in said low pressure conduits permitting a flow of low pressure air through said last mentioned conduits into the lower ends of the cylinders during upward travel of said pistons, and
   a control circuit simultaneously opening the inlet valve and transfer valve associated with each cylinder for admitting a flow of high pressure air and air transferred from the bottom side of the cylinder, said control circuit simultaneously closing the exhaust valve and the low pressure valve associated with each cylinder during the downstroke of the piston, said circuit operable additionally to simultaneously reserve the positions of the valves whereby the piston under the influence of low pressure air and said compressible means causes an impulse of air to be exhausted into the high pressure conduit and to a subsequent cylinder of the series with the piston of the last cylinder of the series operable to impart a force to a media for the operation of a motor.

2. The system as claimed in claim 1 installed on a vehicle and additionally including wheel air cylinders disposed intermediate the frame and movable wheel suspension members of a vehicle, said air cylinders constituting an air pumping means for charging said pressure storage vessel.

3. The system as claimed in claim 1 wherein said transfer line of each piston and the high pressure conduit serving the piston merge whereby a combined flow of air and air exhausted from the lower end of the cylinder enter the upper end of the cylinder.

4. The system as claimed in claim 1 additionally including a low pressure tank to receive the air exhausted by said fluid operated motor, additional low pressure conduits communicating the low pressure tank with the lower end of said cylinders.

5. The system as claimed in claim 4 wherein each of said cylinders is supplied with a merging flow of low pressure air said additional low pressure conduits including check valves.

6. The system as claimed in claim 1 wherein said compressible means comprises a helical compression spring housed within each of said cylinders, said springs having a spring rate increasing proportionally to the diameter of the cylinders.

7. The system as claimed in claim 1 additionally including a low pressure tank in receiving communication with said fluid motor, said low pressure conduits including both conduits in communication with said last mentioned tank and the cylinders and additional conduits in communication with the pressure storage vessel via pressure reducing means whereby either said lower pressure tank or said vessel may supply low pressure air to the underside area of the pistons.

* * * * *